(No Model.) 2 Sheets—Sheet 1.
J. TASCHER.
MAGAZINE CAMERA.

No. 525,239. Patented Aug. 28, 1894.

Witnesses:
R. J. Jacker.
Flora L. Brown.

Inventor:
John Tascher
By Charles Turner Brown
Atty.

(No Model.) 2 Sheets—Sheet 2.
J. TASCHER.
MAGAZINE CAMERA.

No. 525,239. Patented Aug. 28, 1894.

Witnesses:
R. J. Jacker.
Flora L. Brown.

Inventor:
John Tascher,
By Charles Turner Brown, Atty.

UNITED STATES PATENT OFFICE.

JOHN TASCHER, OF CHICAGO, ILLINOIS.

MAGAZINE-CAMERA.

SPECIFICATION forming part of Letters Patent No. 525,239, dated August 28, 1894.

Application filed March 21, 1894. Serial No. 504,521. (No model.)

*To all whom it may concern:*

Be it known that I, JOHN TASCHER, a resident of the city of Chicago, in the county of Cook and State of Illinois, have invented certain new and useful Improvements in Photographic Cameras, of which the following, when taken in connection with the drawings accompanying and forming a part hereof, is a full and complete description, sufficient to enable those skilled in the art to understand and make the same.

The invention relates to photographic cameras wherein means are provided for storing more than one sensitized plate, and for moving such sensitized plates, when desired, from the storage chamber wherein they are contained to proper position in the exposing chamber of the camera, and for removing the plate after exposure to a second storage chamber, such last named storage chamber being adapted to contain the exposed plates for an indefinite time and until removed.

The object of my invention is to obtain a photographic camera of the kind named whereby sensitized glass plates, or sensitized plates of other material than glass can be stored, removed from such storage chamber to the exposing chamber of the camera and placed in position for exposure without exposing the plate thus placed in position or the remaining sensitized and unexposed plates to light; for exposing a sensitized plate when in position; for removing the exposed plate (now constituting an undeveloped negative) to a second storage chamber, without exposing the undeveloped negatives, if any, already contained in said storage chamber to light, and for retaining such undeveloped negatives in the last named storage chamber unexposed to light while remaining therein.

Another object of my invention is to obtain a camera of the kind named into which a package (box) of sensitized plates can be placed without breaking the package and in which the package or box can be opened and the plates used; and a camera in which the exposed sensitized plates can be repacked and taken from the camera, and without taking such camera into the dark room and without exposing the plates to the light.

Another object of my invention is to obtain a photographic camera of the kind named whereby the object to be photographed may be focused, in the ordinary way.

Figure 1:
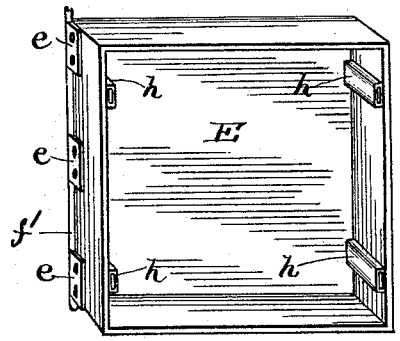
Figure 2:
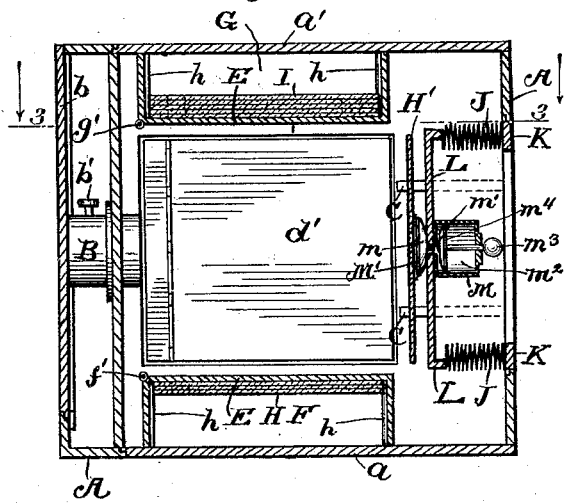
Figures 3, 4:
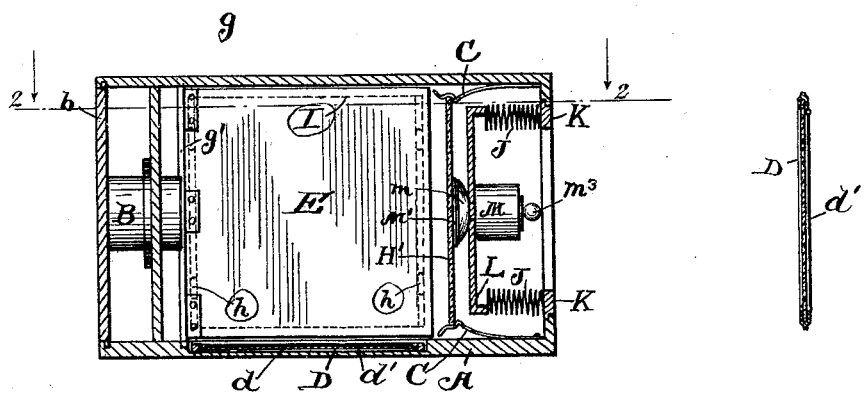
Figure 5:
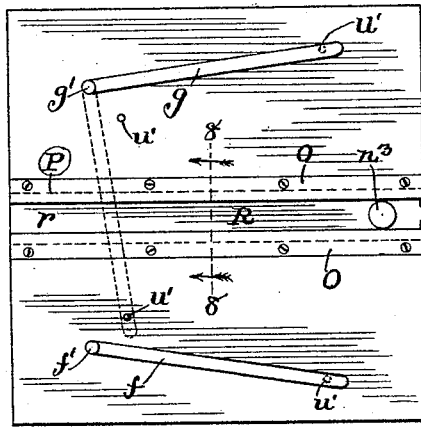
Figure 6:
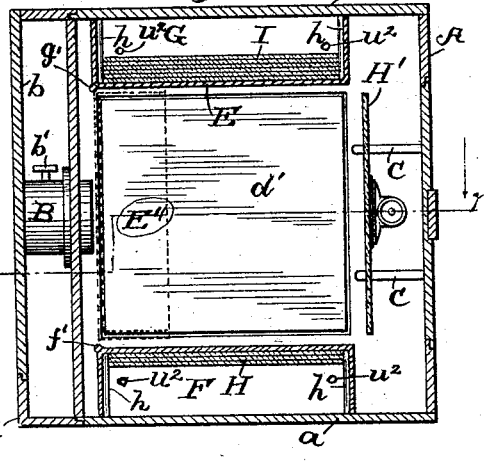
Figure 7:
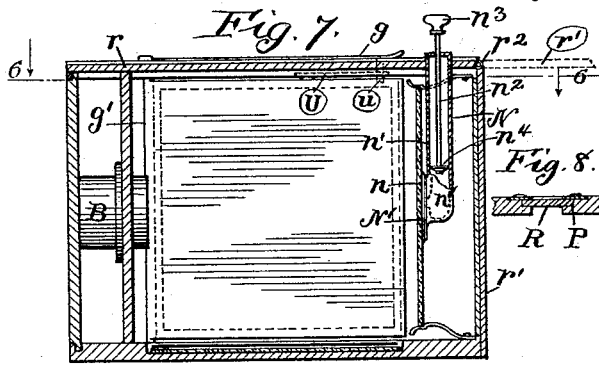
Figures 8, 9:
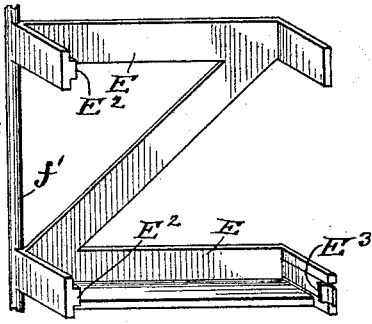
Figure 10:
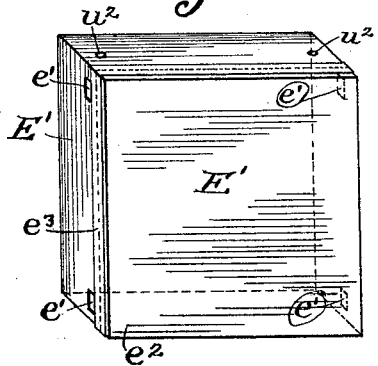
Figure 11:
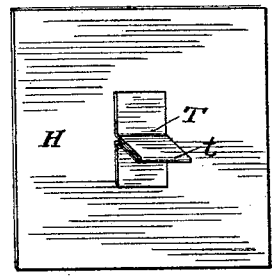

In the drawings referred to as a part of this specification, Figure 1 is a perspective view of a storage receptacle for sensitized plates forming an element in the photographic camera embodying my invention; Fig. 2 a horizontal sectional view of a camera embodying my invention, on line 2—2 of Fig. 3, viewed in the direction indicated by the arrows; Fig. 3 a vertical sectional view on line 3—3 of Fig. 2, viewed in the direction indicated by the arrows; Fig. 4 a vertical sectional view of a focusing screen and cover forming an element of the camera embodying my invention; Fig. 5 a top plan view of a modification of the camera embodying my invention; Fig. 6 a horizontal sectional view of such modification on line 6—6 of Fig. 7, viewed in the direction indicated by the arrows; Fig. 7 a vertical sectional view of such modification on line 7—7 of Fig. 6, viewed in the direction indicated by the arrows; and Fig. 8 a vertical sectional view of the slide forming a part of such modification, on line 8—8 of Fig. 5, viewed in the direction indicated by the arrows. Figs. 9 and 10, illustrate a modification of one of the elements (the storage receptacle) of the machine, Fig. 9 constituting a movable frame and Fig. 10 a sensitized plate receptacle consisting of a box attachable to and detachable from the frame illustrated in Fig. 9; when combined such frame and box constitute a storage receptacle substantially like the storage receptacle illustrated in Fig. 1. Fig. 11 is a perspective view of the back of a sensitized plate having a ribbon or tape secured thereto, (by means of paste, glue, or cement) and Fig. 12 a modification of the expansible bellows forming an element in the camera, such modification having a flexible light-proof diaphragm substituted for the pneumatic holder and exhauster illustrated in Figs. 2, 3, 5, 6 and 7 of the drawings, and such modification suitable for use with sensitized plates having secured thereto a ribbon or tape substantially as illustrated in Fig. 10.

The same letter of reference is applied to a given part throughout the several figures of the drawings where more than one illustration of such part appears.

A is a camera box, $a$, $a'$ are slides therein,

B is a lens tube, b is the ordinary camera-box slide used to protect the lens. This slide b is withdrawn from in front of the lens when an exposure of a sensitized plate is to be made. C C are spring clasps adapted to hold a sensitized plate in position for exposure, or a ground glass in position for focusing, and D is a ground glass plate adapted to be used as a focusing screen when placed in the clasps C C. d is a receptacle in the bottom of the camera-box A adapted to hold ground glass D, and is used to so hold it when such ground glass is not being used as a focusing plate. $d'$ is a cover on plate D by means of which such ground glass can be conveniently moved from the receptacle d to the clasps C C for use as a focusing glass and returned from such clasps to the receptacle, and by which the glass is covered when in receptacle d so that no reflected light will be thrown therefrom when a sensitized plate is being exposed.

E (Fig. 9) is a frame having secured thereto shaft or axle $f'$, by means of which it is pivotally secured in the camera-box A, and E' (Fig. 10), is a box adapted to have sensitized photographic plates contained therein. F is a storage chamber formed by placing box E' on frame E, or by attaching shaft or axle $f'$ (as by means of angle bars $e\ e$), directly to box E', and thus a storage chamber adapted to hold either sensitized and unexposed, or sensitized and exposed (undeveloped negatives) plates is obtained.

$f$ is a handle secured to pivotal shaft or axle $f'$,—so that turning of handle $f$ will turn storage chamber F from the position thereof illustrated in Fig. 2 to a position at right angles thereto and in back of lens tube B; such last named position being indicated by dotted lines lettered $E^4$ in Fig. 6. $g$ is a like handle secured rigidly to pivotal shaft or axle $g'$, of storage chamber G. Storage chamber G can be turned by handle $g$ into a position at right angles to its closed position, that is to a position back of the lens tube B and in substantially the position illustrated by the dotted lines lettered $E^4$ in Fig. 2.

Throughout this description storage chamber F will for convenience and to avoid confusion be spoken of as a storage chamber for unexposed sensitized plates and chamber G will be spoken of as a storage chamber for undeveloped negatives, although such chambers are duplicates and made as hereinbefore described by placing box E' on frame E, such frame having pivotal shaft or axle $f'$ secured thereto or by securing such pivotal shaft or axle directly to box E' (as by means of parts $e\ e$).

H are unexposed sensitized plates in chamber F, and H' is a sensitized plate in clasps C C.

$h\ h$ are holders in chamber F for maintaining sensitized plates therein in an upright position. These holders $h\ h$ are preferably made of strips of yielding material as velvet, rubber tube, or short bristle brushes.

I are undeveloped negatives, that is, exposed sensitized plates in chamber G, and $h\ h$ are holders in chamber G adapted, as are holders $h\ h$ in chamber F, to hold the plates in an upright position.

J is an ordinary light proof expansible bellows secured at one end to frame K adapted to fit into opening corresponding therewith in camera-box A and at the other end to movable panel L.

M is an air exhauster and sensitized plate grasping device secured to panel L, consisting of the concave disk $m$ having flexible material M' on the inner or concave side thereof, passageway $m'$ extending through the panel L, tube $m^2$ on the outer side of panel L and handle $m^3$ having piston head $m^4$ on the inner end thereof (in tube $m^2$,) by means of which the air between the flexible covering on the concave face of disk $m$ and the thing with which such flexible covering is in contact (usually the back of a sensitized photographic plate) can be exhausted when it is desired to grasp a plate or other thing therewith; and by which air can be supplied to the under side of such concave disk when the thing grasped thereby is to be released.

U is a spring set into the walls of the camera so as to yieldingly stand in a retracted position. $u$ is a pin secured in spring U. $u'$ is a hole in the camera-box through which pin $u$ extends, projecting slightly beyond the outer face of the camera-box. When the handles $f$, $g$, respectively, are over any one of the respective pins $u, u$, such pin is thereby forced inward and into position engaging with hole $u^2$ in the walls of the respective storage chambers F, G. The storage chamber is thus by this pin $u$ held in either an opened or closed position, while upon lifting the handle (against the resilience thereof where, as I prefer, such handle is of spring metal), preparatory to changing the position of the storage receptacle, such pin $u$ is immediately disengaged from the storage receptacle by the resilience of spring U. The force of the spring of the handle of the storage receptacle is sufficient to overcome the resistance of the spring U.

The hole $u^2$ does not extend through the wall of the receptacle or box E and may be termed, when the receptacle or box E is made of thin material, as sheet metal, a circular indentation. If the hole were extended entirely through the wall of receptacle or box E it would require to be covered to make such receptacle or box light proof.

When the storage receptacle is built up of the frame E and box E' in order to secure such box firmly in place some catch should of course be provided.

$E^2$ is a projection on frame E adapted to fit into one of the indentations $e'\ e'$ on box E', and $E^3$ is a spring catch also adapted to fit into one of the indentations $e'\ e'$ in such box E'.

$e^2$ is the cover of box E' and $e^3$ is a strip of flexible material securing the cover $e^2$ on box E' and at the same time serving to render such cover more certainly light proof.

The modification illustrated in Figs. 5 to 8, both inclusive, of the drawings, presents a way of constructing the air exhauster and its connections whereby a substitute is obtained for the bellows J, removable frame K and panel L. In this modification the clasps C are retained, and an air exhauster substantially like the one hereinbefore described is employed.

N is the air exhauster and consists of concave disk $n$ covered with flexible material N', tube $n'$ having an opening communicating with the under side of cup $n$; and piston-rod $n^2$, with piston-head $n^4$ at the lower end thereof and handle $n^3$, by which the piston-rod may be operated, at the upper end thereof.

O O are strips placed on the upper face of the top of the camera box A on each side of the slot P and forming groove Q in which the slide R is adapted to be moved forward or backward. Slide R is composed of two parts lettered respectively, $r\ r'$ connected together by hinge $r^2$. The hinge $r^2$ is light proof and the slide R is light proof in the grooves Q. Tube $n'$ is secured in slide R and by bringing the part $r'$ into the position indicated by the dotted lines in Fig. 7 such slide can be moved forward, together with the air exhauster N, until the cup $n$ is in contact with the back of a sensitized plate contained in the opened storage receptacle in back of lens tube B.

Figure 12:
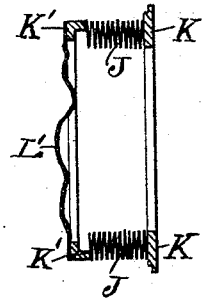

The modification illustrated in Figs. 11 and 12 consists of securing the tape T to the back (unsensitized face) of a sensitized photographic plate so that the loop $t$ is formed thereby and in removing the panel L with exhauster M thereon from the expansible light proof bellows and substituting therefor frame K' and flexible diaphragm L'. The diaphragm L' is light proof and may well be made of thin rubber cloth so that the loop $t$ of tape T can be grasped therethrough.

The operation of the camera is, (when constructed as illustrated in Figs. 1, 2, 3 and 4,) assuming that the storage chamber for unexposed sensitized plates has been properly loaded, in a dark room: Handle $f$ is turned so that the storage chamber F to which it is attached will be opened, (that is turned inwardly into the exposing chamber of the camera and back of the lens tube B,) and then panel L and exhauster M are pushed forward until the flexible covering of disk $m$ is in contact with one of the plates H. The handle of the exhauster M is then drawn back and thereby the air between the flexible covering of disk $m$ and the plate is exhausted and the plate is seized. The exhauster, M, panel L and concave disk $m$ are then drawn backward until the plate is seized and held by the clasps C C. Air is then supplied to between the flexible covering of disk $m$ and the plate by pushing the handle $m^3$ of the exhauster M, in. Storage chamber F is then closed by handle $f$ and an exposure of the plate, (H',) is made in the ordinary way.

To deposit the plate H' in the storage chamber G such storage chamber (operated by handle $g$), is opened by being turned inwardly into the exposing chamber of the camera and into a position in back of the lens tube B; the air under the flexible covering of disk $m$ is again exhausted and the plate, (with exhauster M and panel L,) again pushed forward until the plate is in the storage chamber G; when handle $m^3$ of the exhauster is released or pushed forward and the plate dropped.

The exhauster M is then brought back to its initial position (but with no plate thereon) and the storage chamber G turned by the handle $g$ and again closed.

To use the ground glass D for a focusing screen, panel L and frame K are removed from the camera, and through the aperture thus made glass D is raised into position in clasps C C, with cover $d$ raised, (and extending out back of the camera,) so the glass can be observed. The lens tube is then focused by thumb wheel $b'$ in the ordinary way.

The operation of the modification illustrated in Figs. 5, 6, 7 and 8 is the same as the operation hereinbefore described of the camera constructed as illustrated in Figs. 1 to 4, both inclusive, of the drawings, and hence no description of the manner of working thereof is required.

When the storage receptacle is constructed of frame E and box E' such box containing plates as purchased is placed in the frame E by opening slide $a$, and there secured by projection $E^2$ and catch $E^3$ engaging in indentations $e'\ e'$, respectively. The slide $a$ is then closed and (flexible strip $e^3$ having been cut) by means of handle $f$ the storage receptacle is opened by being turned into the exposing chamber of the camera, and back of the lens tube B. The cover $e^2$ of the box E', is then grasped by pneumatic holder M, in the same manner as a sensitized plate is grasped thereby, and the storage receptacle closed. Storage chamber G is then opened and such cover is (by means of the pneumatic holder M) placed over the box part of such storage chamber G and the chamber closed. Slide $a'$ is then moved and the box E' taken from frame E and an empty box placed in such frame after which the slide $a'$ is replaced and the camera is ready for use as hereinbefore described.

Having thus described my invention, what I claim, and desire to secure by Letters Patent, is—

1. The combination in a camera of a frame removably secured in the camera, an expansible light-proof bellows secured to the frame and to a movable panel extensible into the exposing chamber of the camera, a pivotally movable storage chamber within the camera, a handle outside the camera connected to the storage chamber whereby such storage chamber can be swung inwardly into the exposing chamber and into a position in back of the lens of the camera and in front of the movable panel, and means in such panel for grasping from the outside thereof and without extending the hand therethrough a sensitized photographic plate contained in the storage chamber; substantially as described.

2. The combination of an expansible bellows secured at one end around an opening in a camera box and extensible thereinto, a panel attached to the inner end of the expansible bellows, a concave disk on the inner side of the panel, a flexible covering to the concave disk, an air passage way from the concave side of the flexible covering of the disk to outside the exposing chamber of the camera and to an air exhauster, and an air exhauster; substantially as described.

3. The combination of a pivotally movable frame within a camera, a handle outside the camera, and a connection between the frame and the handle whereby the position of the frame is controlled by the handle, with a receptacle for holding sensitized photographic plates adapted to be removably attached to the frame, means for securing the receptacle to the frame, such camera having an aperture with a removable light proof cover through which aperture the receptacle can be passed in attaching it to and removing it from the frame, whereby such receptacle when mounted on the frame will, in combination therewith constitute a movable storage chamber for sensitized photographic plates; substantially as described.

4. The combination of a pivotally movable frame, within a camera a rigid projecting lug on the frame, a yielding lug on the frame, a handle outside the camera connected to the frame, and a receptacle for sensitized photographic plates, such receptacle having recesses in the outer faces of the sides thereof into which recesses the several lugs are adapted to fit when the receptacle is placed in the frame; substantially as described.

5. The combination of a storage chamber for sensitized photographic plates consisting of a receptacle for such plates pivotally mounted in the camera, with strips of flexible material secured to the sides of the receptacle and adapted to come in contact with the edge of plates contained in the receptacle, and a handle outside the camera connected to such storage chamber, whereby it can be turned on its pivot; substantially as described.

6. The combination of exposing and storage chambers in a camera, such storage chambers consisting respectively of pivotally mounted receptacles for sensitized photographic plates in the camera, and handles outside the camera connected to the respective storage chambers, with spring catches in the camera extending through the top of the camera and respectively adapted when retracted not to engage with the receptacle of the storage chamber, and when protracted by the handle outside the camera coming in contact therewith to engage with and hold the storage receptacles in an open or closed position; substantially as described.

JOHN TASCHER.

Witnesses:
CHARLES TURNER BROWN,
RUTH L. NOLL.